United States Patent [19]
Just

[11] Patent Number: 6,024,881
[45] Date of Patent: Feb. 15, 2000

[54] MAGNETIC ABSORPTION TREATMENT OF FLUID PHASES

[76] Inventor: Gerard A. Just, P.O. Box 2522, New Orleans, La. 70176

[21] Appl. No.: 09/132,568

[22] Filed: Aug. 11, 1998

[51] Int. Cl.⁷ .............................. B01D 35/06; C02F 1/48; B01F 3/00
[52] U.S. Cl. ..................... 210/695; 210/702; 210/704; 210/738; 210/219; 210/220; 210/221.2; 210/222; 366/164.1; 366/164.6; 366/172.1; 366/172.2; 366/264; 366/608; 261/93; 96/1; 95/151
[58] Field of Search ........................ 261/93; 360/164.1, 360/164.6, 172.1, 172.2, 264, 608; 210/695, 702, 704, 738, 219, 220, 22.2; 96/1; 95/151

[56] References Cited

U.S. PATENT DOCUMENTS 4,879,045  11/1989  Eggerichs ............................... 210/695
5,650,100   7/1997  Just ......................................... 261/93

Primary Examiner—David A. Reifsnyder
Attorney, Agent, or Firm—Beirne Maynard & Parson, L.L.P.

[57] ABSTRACT

The present invention is directed to an apparatus and method for providing absorption of two fluid phases with one another and for the magnetic treatment of the phases for molecular realignment for effective separation of contaminants.

6 Claims, 2 Drawing Sheets

MAGNETIC ABSORPTION TREATMENT OF FLUID PHASES

BACKGROUND OF THE INVENTION (1) Field of the Invention

The invention relates to the absorption of fluid phases with one another, such as a liquid with a gas, or a gas with a liquid, across a magnetic field whereby the molecular structure of the fluid is altered to abate or reduce undesirable colloidal and other properties of at least one of the phases in the fluid.

(2) Description of the Prior Art

Magnetic and colloidal nucleation is well known and is based on Faraday's Law relating to electromagnetic induction:

$$EMF = kqvB \sin \phi,$$

where:

- EMF=equals an electromotive force minus an induced force on a charge particle moving through a magnetic field;
- k=a proportionality constant (a component is conductivity);
- q=the charge of an ion;
- B=the strength of the magnetic field;
- V=the velocity of the conductor; and
- $\phi$=the angle of the magnetic field lines of force relative to the flow.

As charged nucleus fluids, such as crude oil, which is a mixture of hydrocarbons and minerals having various chain lengths and electrical potential pass through a magnetic field, numerous forces will interact. When Faraday's Law is applied, the electrical charges are effected at the surface of the material and the direction of orientation is altered permitting them to re-cluster to form colloids which may be separated from the fluid stream. This technique results in colloidal separation from a main stream fluid without incorporation into the fluid stream of expensive chemicals which provide the same result, i.e. a separable fluid stream, but are not nearly as efficient.

In my U.S. Pat. No. 5,650,100, entitled "Apparatus for Providing Absorption of Gaseous and Liquid Phases" issued Jul. 22, 1997, I disclosed an apparatus for the absorption of two fluid phases with one another. I have now found that this apparatus may be modified to apply the principals of Faraday's Law whereby absorption of a gas into a liquid, or a liquid into a gas, and the resulting product may thereafter be exposed to a magnetic field to realign the nuclei within one or both of the liquid or gas phases so that paraffin, scale, rust, or other contaminant may be abated, eliminated or easily separated and removed from the resultant fluid stream.

In many instances, it is necessary to mix or absorb a gas into a liquid stream, or vice versa, in order to initiate a chemical reaction or thermal transfer for desired combination with an end compound product. For example, absorption of oxygen into water is necessary to restore depleted oxygen to water, the resulting product being used to oxygenate large aquarium or waste waters that are oxygen depleted. Typically, such fluid streams will also contain contaminants which must be separated from the fluid stream in some manner before recirculation or other use. I have found that incorporating magnetic treatment in combination with my absorption technique and device will enable enhanced abatement or elimination of such contaminants during the absorption process, thus eliminating further mechanical agitation, chemical treatment, and/or other steps or procedures to obtain the desired end fluid stream.

While it is known that absorption of a gas, such as oxygen, into a liquid phase, such as water, which is heavily ladened with dissolved iron will assist the precipitation of iron to a particulate for removal purposes, and that steam as a gas can be induced into condensate return water for removal of carbon dioxide gas in deairation processes, it is heretofore been unknown to combine such a process with the effects of magnetic field treatment to virtually change the nuclei in the liquid to precipitate or otherwise colloidally structurize the thus treated fluid.

As an example of the utility of use of my present invention, it may be utilized during the chlorinating of waste water with a measured amount of chlorine induced through absorption into the water phase and the resultant fluid combination passed through the magnetic field for nuclei adjustment of contaminants in the liquid phase.

SUMMARY OF THE INVENTION

The present invention contemplates magnetic treatment of a first fluid phase, such as an aqueous stream, through absorption within a second fluid phase, such as a gaseous environment. The apparatus comprises a cylindrical housing within which is defined a central chamber having a plane of flow for a first fluid phase which has a charged molecular structure. The central chamber also includes a fluid flow passageway therethrough for the first fluid phase. A shaft such as a tube, cylinder, or a flat plate or other sphere, is provided which traverses the chamber and which may be magnetically charged, either positively or negatively. The shaft extends through the passageway along the plane of fluid flow with the shaft having a distal end and a dorsal end. A plurality of impeller means are provided and which preferably may be carried around the shaft and positioned distally away from the shaft dorsal end. Means are provided for introducing the first fluid phase into the central chamber between one of the impeller means along the plane of flow within the passageway. Likewise, means are provided for introducing the second fluid phase into the central chamber immediate the impeller means. At least one magnetic field means, such as a series of laterally disposed magnets are placed along the exterior of the housing and are magnetically chargeable in opposition to the magnetic charge on the shaft. Vacuum initiating means are carried between the impeller and in substantial axial alignment with the means for introducing the second fluid phase to the central chamber. A discharge open end is provided through the vessel which communicates with the central chamber for transporting the resulting magnetically treated and absorbed fluid phase within the chamber. The shaft and the magnetic field means are electrically charged to create a magnetic field within the passageway and across the plane of fluid flow, whereby the charged molecular structure of the first fluid phase transmitted through the passageway and the impeller means may be aligned perpendicularly relative to the plane of flow of the fluid.

A method for magnetically treating the phases through absorption also is disclosed, in which the apparatus, as described above, is provided and whereby the phases are introduced into the apparatus under a vacuum, with application of heat and/or pressure if desired, for absorption of one of the fluid phases into the other of the fluid phases and in which the fluid phases are passed through the impeller means in absorption and across the magnetic field and out the discharge open end of the apparatus for selective separation of contaminants within one of the fluid phases, or both, as desired.

DESCRIPTION OF THE PREFERRED EMBODIMENTS

Figure 1:
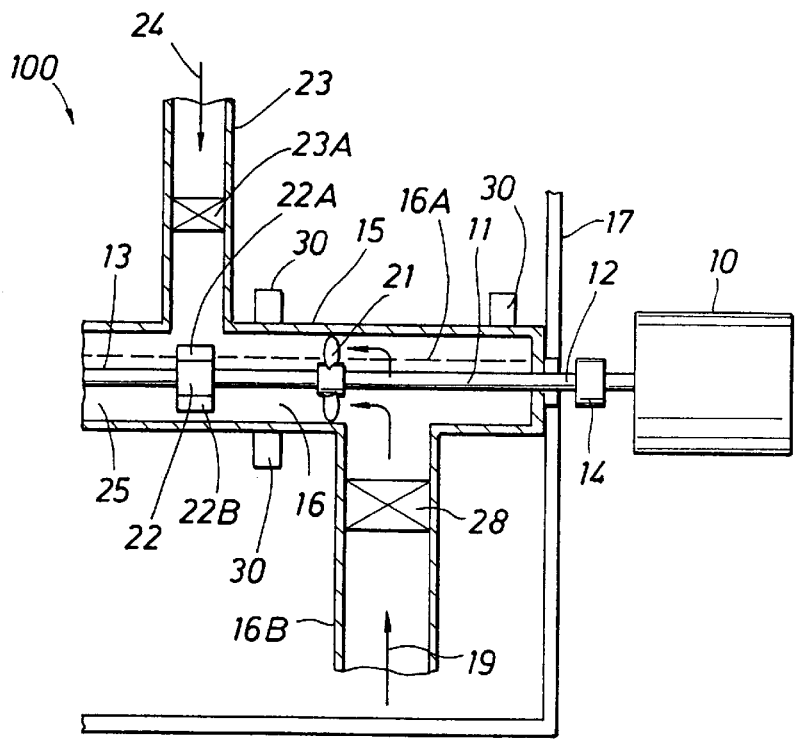
FIG. 1 is a cross-section schematic illustration of the various components of the magnetic absorption device of the present invention and shown in one embodiment.

Now referring to FIG. 1, there is shown one apparatus 100 of the present invention. The apparatus 100 includes an electric motor 10 which manipulates a shaft 11. The shaft 11 may be made of any component material which may be positively or negatively changed, and may be flat, hollow, or a plate or other spherical element which may be positively or negatively charged in combination with an opposite charge on or through the housing 15 to provide a magnetic field thereacross. The shaft 11 has a dorsal end 12 in communication with the motor 10. Likewise, the shalt 11 has a distal end 13 extending farthest from the motor 10. Support 14 is provided for alignment of the shaft 11 within the cylindrical housing 15 defining a central chamber 16 therein. The cylindrical housing 15 may be positioned within a tank, or the like, 17, in which the absorbed fluids are contained. The central chamber 16 defines a plane of flow 16a for a first fluid phase, such as an aqueous stream, as well as a fluid flow passageway 16B for the first fluid phase.

The cylindrical housing 15 has means, such as valve 28, for introducing one of the phases (i.e., a liquid) 19 into the chamber 16. An impeller 21 is positioned relative to the shaft 11 for agitation of the fluid 19 toward the distal end 13 of the shaft 11.

Positioned on the shaft 11 is a vacuum initiating means 22 shown in the form of a squirrel cage vacuum draw. The vacuum initiating means 22 is in substantial axial alignment with means for introducing a gaseous fluid phase, such as conduit 23, communicating with the interior or central chamber 16 of the cylindrical housing 15. The conduit 23 provides means such as valve 23A for introduction of a gaseous phase 24 through the conduit 23 and into the chamber 16 in axial alignment with vacuum draw 22 which has openings 22A and 22B for introduction and ejection, respectively, of the gaseous phase within the chamber 16 and into the fluid phase 19 passing there across in the chamber 16 and along the plane of flow 16a. The fluids 19 and 24 are absorbed relative to one another by means of the impeller 21.

A series of magnets 30 are secured radially and horizontally around the exterior of the housing or vessel 15 and are magnetically charged in opposition to the charge on the shaft 11. As the fluid phase passes along the plane of flow 16a, one of the phases is absorbed into the other phase and the fluid stream passes across the magnetic field resulting from the electric charges on the shaft aid the housing, whereby re-alignment of the molecular structure of the treated fluid phases will result, for subsequent separation of contaminants, and the like.

The subsequent absorbed fluid phases are discharged from the vessel 16 into the tank 17, or similar container, through the open end 25 in the vessel 15 and the resultant absorbed fluid 18 is contained within vessel 17 or, alternatively, may be selectively and incrementally removed therefrom, by known means. Valves, such as 28 and 23A, may be placed on the conduits 16B and 23, respectively, to open and close, or throttle, the volume/rate of the fluids 19 and 24 introduced there through.

Figure 2:
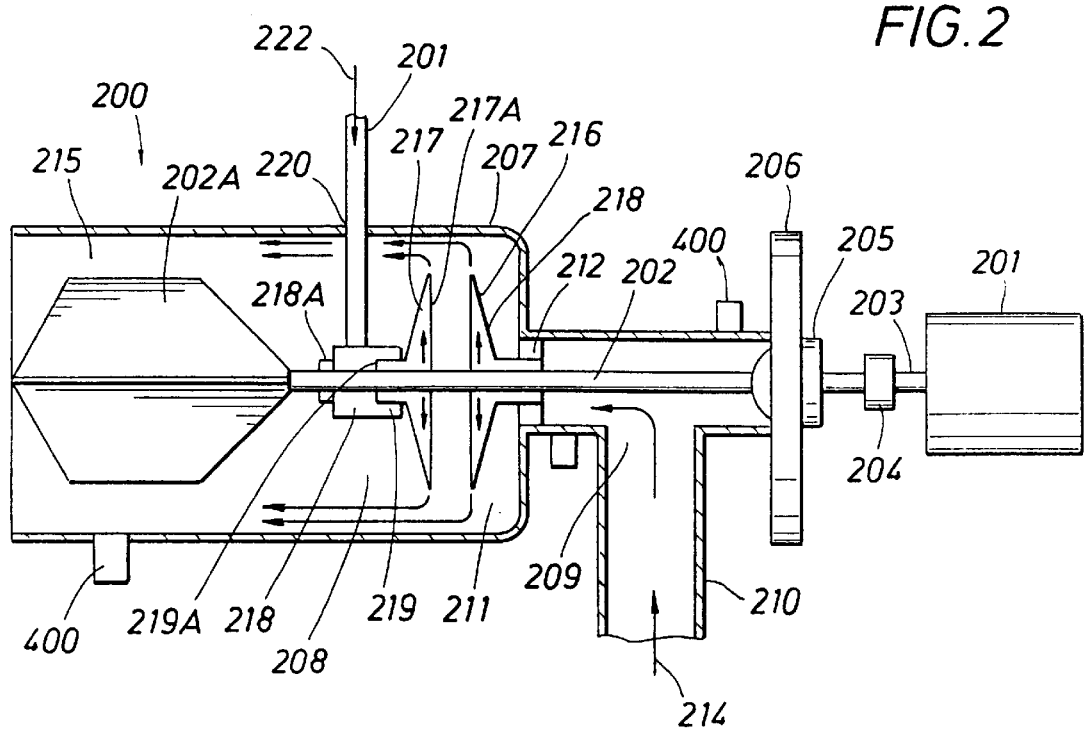
FIG. 2 is a cross-section schematic illustration of another embodiment of the present invention.
Figure 4:
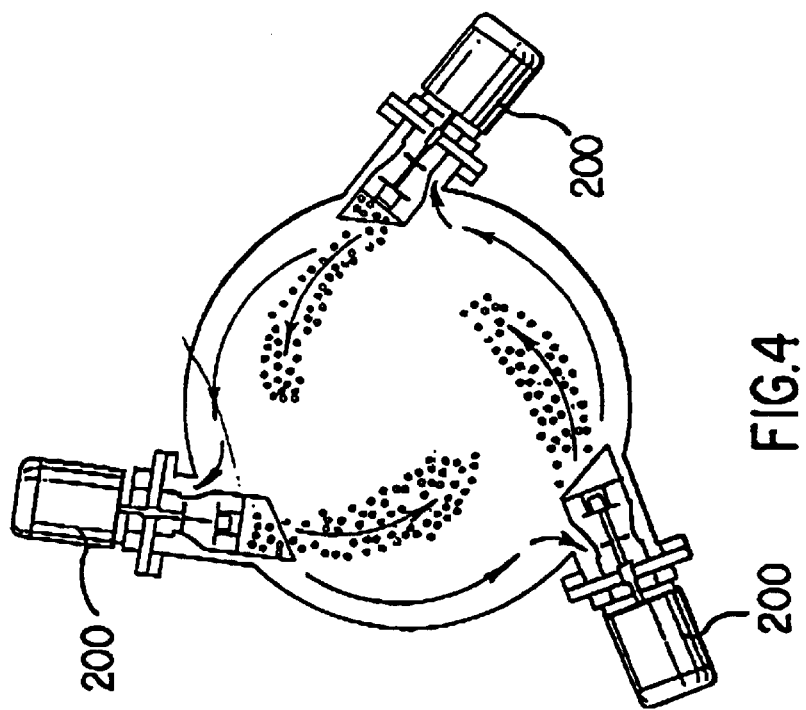
FIG. 4 is a cross section schematic illustration through the chamber of the tank showing a series of absorption devices of the present invention spaced along a horizontal plane.

FIG. 2 shows another version of the preferred embodiment 200. In this embodiment, a motor 201 is provided on a shaft member 202 at the dorsal end 203 of the shaft member 202 for rotating or otherwise manipulating the shaft member 202. Typically, the motor is an electric motor, but may be one driven by fossil fuel burning, such as a diesel engine. A shaft coupling 204 is provided between the motor 201 and the shaft member 202. A bearing 205 is disposed around the shaft member 202 and communicates with a flange 206 including a mechanical seal (not shown) disposed around and carried on the shaft member 202. A hollow conduit is carried on the flange seal 206 through which is disposed the shaft member 202. A shaft member or plate 202A means 219. The shaft member or plate 202A may be stationary and separated from the shaft member 202 or, alternatively, may be operatively engaged with the shaft member 202 and rotated therewith within the vessel or housing 207. The member 202A is electrically charged to provide a magnetic force, as illustrated with the embodiment of FIG. 1. Likewise, magnets 400 are placed around the exterior of the housing or vessel 207, or may be secured to the inside wall of the vessel 207. The vessel 207 provides a hollow interior chamber 208 around the shaft member 202 and also provides an opening 209 through which is received a conduit member 210 for introduction into the chamber 208 of a liquid phase, such as water. The vessel 207 contains an absorption chamber portion 211 and houses an impeller seal 212 having an opening therethrough around the shaft member 202 for transmission of the liquid phase 214 from within the chamber 208. A series of first and second impellers and 216 and 217, respectively, as provided along the shaft 202.

As shown, the impellers 216, 217, have vanes thereon (shown schematically) through which the fluid 214 is disposed and agitated into the chamber portion 215. An impeller support block 218 is provided having support 218A for securement of the impellers and a vacuum initiating means 219 thereon.

An opening 220 is provided within the housing or vessel 207 for introduction of a conduit 201 therethrough which will carry a gas or liquid phase 222 therein and into the vacuum initiating means 219 discharge through opening 219A into the vanes 217A on the impeller 217 and for discharge of said gas or liquid phase 222 into the chamber 215. As the fluid phase 214 and the fluid phase 222 are agitated through the impellers 216, 217, and across the vanes 218, 217A, they are absorbed relative to one another within the chamber 215 and the magnetic field caused by the electric charge of the plate 202A and that within the magnets 400 will cause magnetic realignment of the molecular structure of the fluid to be treated for subsequent separation of a contaminant.

Figure 3:
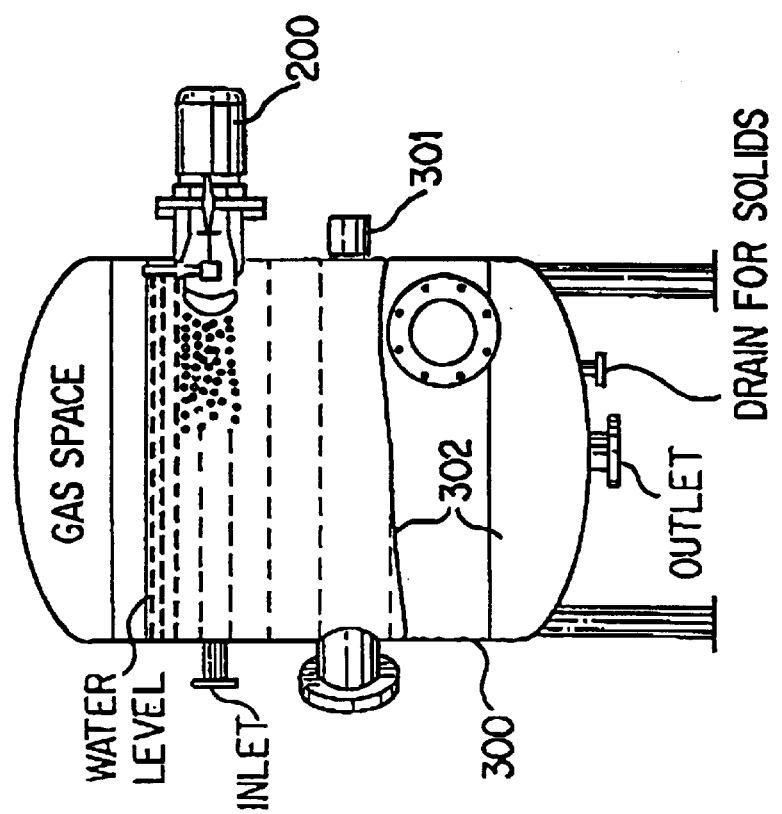
FIG. 3 is an exterior illustration of a chamber extending through the housing in a series of vertically spaced absorption apparatuses.

The device 200 may be inserted, through opening in a tank 300 shown in FIG. 3 which may be pressurized through pressure means 301, such as a pump, in known fashion, and/or heat or refrigerant may be applied to the interior of the tank 300 and/or the housing 207 such as by use of a thermal blanket 302 wrapped around the exterior, or a part thereof, of the tank 300.

It will be appreciated by those skilled in the art that the impellers 216 and 217 are positioned along the shaft 202 in back-to-back, or reverse, relationship. Likewise, the vanes 218 and 217A create a vacuum inside the respective impellers as they are rotated. This, in turn, permits respective fluid phases 213 and 222 to be drawn across the respective impellers 216 and 217 for mixing into the resultant absorbed fluid phases.

When the fluid 222 is a gas, such as air, and the fluid 214 is water, it has been found that a very fine dispersal of the gas into the water phase is created as the water is pushed across the impellers. Very fine bubbles along the order of a few microns in size are provided by use of the present invention, in either embodiment, and the fine, quality dispersal of these minute bubbles contributes substantially to the ability of the fluid phases to absorb one another.

Each of the apparatuses 100 and 200 provide very finely sheared bubbles when one of the fluids is a gaseous phase and the gas is evenly distributed into the water phase as it passes past the impellers. The water phase comes past the gas phase at the gas impeller and the gas is induced into the water, resulting in a fine mixture of the phases. Accordingly, the fine mixture of the phases will enhance the magnetic realignment of the molecules in the fluid phase to be treated.

It will be appreciated that the present apparatus may be used with or attached to a blower system or a smoke stack. As with fluids, gases have charged particulant matter or solids that can be converted to environmentally safe gases by induction through an electrical or magnetic field as contemplated in my apparatus to provide an end product, reaction or compound.

It will further be appreciated that the shaft and the housing may be made of base metals or exotic metals such as used in cold water fusion. The shaft can be a magnetic (earth, permanent or electro) or an electrical current shorted out between the shaft and the housing in the form of a cathode/anode configuration. The length of the housing and the shaft can be varied to provide for a sufficient reaction parameters to provide the end compound or reaction, and the distance between the shaft and the housing can be varied, as well. Moreover, vanes or spirals can be attached to the outer housing to import a spiral or circular motion to the fluid or gases to further enhance reactions or to direct the fluids or gases to opposing magnetic or electrical fields. Moreover, the apparatus of the present invention can be used for electron valance alignment or conditioning of a molecule for an end compound or reaction.

The mixture of gas imported in the fluid phase may be a part of the actual reaction in a magnetic or electrical field and the gas may expand the fluid being passed to the device to better communicate with the electrical field or to create a reaction for an end compound or reaction. When it is desired to abate the incorporation of a gaseous fluid, the introduced gas may be terminated by provision of a valve or the like (not shown). Likewise, a fluid phase may be selectively throttled or abated through the apparatus by provision of a similar valve or throttle (not shown).

Although the invention has been described in terms of specified embodiments which are set forth in detail, it should be understood that this is by illustration only and that the invention is not necessary limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An apparatus for providing magnetic treatment of a first fluid phase through adsorption within a second fluid phase, comprising:
    (1) a cylindrical housing;
    (2) a central chamber within said housing and defining a plane of flow for a first fluid phase having a charged molecular structure and including a fluid flow passageway therethrough for said first fluid phase;
    (3) a positive or negative magnetically charged shaft traversing said chamber and through said passageway along said plane of flow said shaft having distal and dorsal ends;
    (4) a plurality of impeller means positioned distally away from said shaft dorsal end;
    (5) means for introducing the first fluid phase into said central chamber and along said plane of flow;
    (6) means for introducing the second fluid phase into said chamber immediate said impeller means;
    (7) at least one magnetic means disposed along one of the interior or the exterior of said housing and being magnetically charged in opposition to the magnetic charge of said shaft;
    (8) vacuum initiating means carried between the impeller means and in substantial axial alignment with said means for introducing the second fluid phase into the central chamber; and
    (9) a discharge open end through the vessel communicating with the central chamber for transporting the resulting magnetically treated and adsorbed fluid phase within the central chamber, said shaft and said magnetic field means being electrically charged to create a magnetic field within said passageway and across said plane of flow, whereby the charged molecular structure of the first fluid phase transmitted through said passageway and said impeller means may be aligned perpendicularly to the plane of flow of the fluid within said housing.

2. The apparatus of claim 1 further comprising means for selectively varying the temperature of at least one of the fluid phases within the central chamber.

3. The apparatus of claims 1 or 2 further comprising means for applying pressure to the fluid phases with the central chamber.

4. A method for treating a first fluid phase introduced through adsorption within a second fluid phase through an apparatus, said method comprising the steps of:
    (a) providing an apparatus having:
        (1) a cylindrical housing
        (2) a central chamber within said housing and defining a plane of flow for a first fluid phase having a charged molecular structure and including a fluid flow passageway therethrough for said first fluid phase;
        (3) a positive or negative magnetically charged shaft traversing said chamber and through said passageway along said plane of flow said shaft having distal and dorsal ends;
        (4) a plurality of impeller means positioned distally away from said shaft dorsal end;
        (5) means for introducing the first fluid phase into said central chamber and along said plane of flow;
        (6) means for introducing said second fluid phase into said chamber immediate said impeller means;

(7) at least one magnetic means disposed along one of the interior or the exterior of said housing and being magnetically charged in opposition to the magnetic charge of said shaft;

(8) vacuum initiating means carried between the impeller means and in substantial axial alignment with said means for introducing the second fluid phase into the central chamber; and (9) a discharge open end through the vessel communicating with the central chamber for transporting the resulting magnetically treated and adsorbed fluid phase within the central chamber, said shaft and said magnetic field means being electrically charged to create a magnetic field within said passageway, whereby the charged molecular structure of the first fluid phase transmitted through said passageway and said impeller means may be aligned perpendicularly relative to the flow of fluid within said housing;

(b) providing a vacuum within said central chamber by initiating said vacuum initiating means, and manipulating said shaft to rotate said impeller means; and (c) introducing each of the first and second phases into the chamber for adsorption of one of the phases into the other of the phases, and passing each of the phases through the impeller means and across the magnetic field and out the discharge open end.

5. The method of claim 4 including the step of selectively varying the temperature of at least one of the fluid phases within the central chamber.

6. The method of claims 4 or 5 further comprising the step of pressurizing the fluid phases within the central chamber.

* * * * *